United States Patent

Hahlganss et al.

[11] Patent Number: 6,067,081
[45] Date of Patent: May 23, 2000

[54] METHOD FOR PRODUCING TACTILE MARKINGS ON AN INPUT SURFACE AND SYSTEM FOR CARRYING OUT OF THE METHOD

[75] Inventors: Günter Hahlganss, Kriftel; Ulrich Roskoni, Wöllstadt; Guido Meier-Arendt, Langen, all of Germany

[73] Assignee: VDO Adolf Schindling AG, Frankfurt/Main, Germany

[21] Appl. No.: 08/932,509

[22] Filed: Sep. 18, 1997

[30] Foreign Application Priority Data

Sep. 18, 1996 [DE] Germany ............ 196 38 015

[51] Int. Cl.[7] ............... G06F 3/14; G06F 3/03; G06K 11/06

[52] U.S. Cl. ............ 345/173; 345/179; 382/187

[58] Field of Search .......... 362/293, 277, 362/319; 359/809; 341/23, 22; 845/173, 326, 333, 121, 473, 508; 710/62, 17, 20; 345/351, 156, 173, 174, 104, 179; 382/187, 192, 198, 229; 702/138; 369/126

[56] References Cited

U.S. PATENT DOCUMENTS

| | | | |
|---|---|---|---|
| 4,894,760 | 1/1990 | Callahan | 362/293 |
| 4,952,932 | 8/1990 | Sugino et al. | 341/23 |
| 5,623,612 | 4/1997 | Haneda et al. | 345/326 |
| 5,793,647 | 8/1998 | Hageniers et al. | 702/35 |

FOREIGN PATENT DOCUMENTS

| | | |
|---|---|---|
| 0556999 | 8/1993 | European Pat. Off. . |
| 4140780 | 9/1992 | Germany . |
| 9200559 | 1/1992 | WIPO . |

*Primary Examiner*—Daniel H. Pan
*Attorney, Agent, or Firm*—Martin A. Farber

[57] ABSTRACT

A method of producing tactile markings on an input surface, in which information is transmitted to the input member in the form of movements of the input surface and an arrangement for the carrying out of the method. In order to produce a large number of tactile markings on an input surface at little technical expense, the position of an input member on the input surface is detected and the position so detected is compared with a virtual coordinate-oriented reference pattern which associates a given movement with each position. Depending on the position of the input member, the entire input surface carries out the movement corresponding to that position.

21 Claims, 2 Drawing Sheets

METHOD FOR PRODUCING TACTILE MARKINGS ON AN INPUT SURFACE AND SYSTEM FOR CARRYING OUT OF THE METHOD

FIELD AND BACKGROUND OF THE INVENTION

The present invention relates to a method of producing tactile markings on an input surface in which information, in the form of movements of the input surface, are transmitted to an input member, and to a system for carrying out this method.

From DE 41 40 780 A1 an input device with tactile feedback is known in connection with which movable elements are arranged on a touch and/or actuating surface, the elements being coupled to a control system which produces a relative movement of the elements with respect to the surface, the movement being perceptible by touch by the operator. The movable elements are in this connection, acted on, for instance, by vibrations of different frequency and intensity whereby coded information is transmitted to the operator.

This has the disadvantage that the tactile differentiation is greatly limited by the fixed arrangement of the movable elements so that only a limited amount of information can be transmitted to the operator. Furthermore, the mechanical and circuit expense for producing this input device, which consists of a plurality of movable parts, is very great.

SUMMARY OF THE INVENTION

It is an object of the invention to provide a method and a system for producing tactile markings (identifiable sensations) in which, despite little technical expense, a large number of tactile markings can be produced on the input surface.

According to the invention, the position of the input member (4) on the input surface (1) is detected, and the position which has thus been detected is compared with a virtual coordinate-oriented reference pattern. This associates a specific movement with each position and, as a function of the position of the input member (4), the entire input surface (1) carries out this movement which corresponds to the position.

The advantage of the invention is that a context-dependent adaptation of the input surface to a instantaneously requested operation is possible, without the input surface having to have any special structural characteristics. The input surface can be freely occupied by tactile markings and the tactile report back to the operator is freely programmable under software control.

The entire input surface is advantageously changeable in height depending on the position of the input member.

In another embodiment, depending on the position of the input member, the entire input surface is placed in vibration with a frequency and/or amplitude corresponding to that position.

In this connection, one event by itself can produce one tactile impression. However, several tactile impressions can be transmitted also by any desired combination of frequency, amplitude and/or deflection in height of the input surface.

In a further development of the method, vibrations are produced in the input direction. The vibrations are preferably produced continuously.

The possibility of a blind carrying out of functions is thus optimally supported, and a reliable orientation of the user on the input surface is made possible.

By means of a pulsed production of vibrations, the input surface can also be used for a coded information output. In this way, information concerning the operation can be reported back to the user over a sensory channel on which less demand is made.

One advantageous arrangement for the carrying out of the method consists of a position-detecting input surface (1) connected to an evaluation unit (5) which stores a virtual reference pattern and conducts signals to a position actuator (2, 3) on which the input surface (1) is arranged, and which actuator carries out the movement corresponding to the position detected.

With this arrangement, a large number of tactile markings which can be changed at any time can be produced by simple means.

The position-indicating input surface can determine the position of the input member with the aid of a number of possibilities; thus, for instance, capacitive, acoustic and optical sensors and methods can be used. However pressure sensors and ultrasonic sensors are also suitable for this purpose.

In the simplest case, the input surface (1) is flat.

For certain cases of use, however, a curved input surface (1) is also possible.

Preferably at least one sensor for the transmitting of input information, preferably a pressure sensor, is arranged on the position actuator.

In a preferred embodiment, the pressure actuator (2, 3) is a vibration generator.

According to a feature of the invention, at least one sensor (13) for the transmitting of input information is provided on the pressure actuator (2, 3).

Still a further feature of the invention is that the sensor (13) for the conducting of input information is a pressure sensor.

This sensor (13) for the conducting of the input information is connected with an information system (10) which controls complex operating functions, this information system (10), in turn, being connected to the evaluation unit (5) for the adapting of the virtual reference pattern to the actual operating function.

In this way, an input command is evaluated by the information system and, as a result, a new virtual reference pattern is provided which takes the input command into account.

In a further development, the evaluation unit is part of the information system. The information system (10) is in this case connected to a visual device (display 11) for displaying the operating function and/or by means of a speech-output unit (12). Display (11) and speech output unit (12) are advantageously part of the information system.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
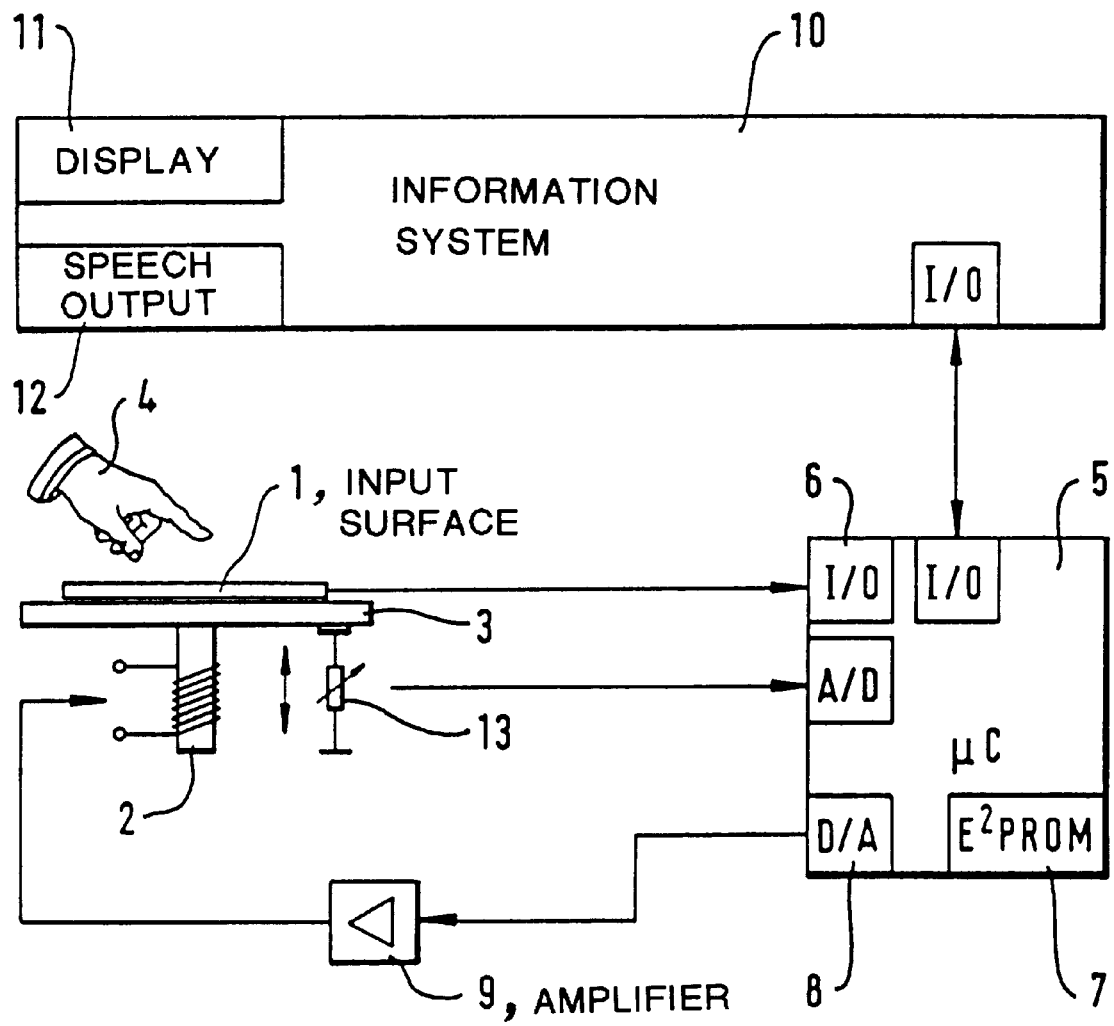
FIG. 1 shows a system in accordance with the invention, together with an information system.

FIG. 1 shows a system in accordance with the invention for use in a motor vehicle information system.

For information systems which are used in motor vehicles such as in navigation systems for instance, menu-controlled inputs are necessary among other things in order to select the target locality and the travel route. Also, upon the detecting of a telephone list, a vehicle-suitable input element is necessary.

The size of the input surface of the input means is determined by the amount of data to be entered.

The input device consists of an unstructured flat, two-dimensional sensor input surface 1 which is positioned on an electromechanical transducer, preferably a vibration generator 2, and firmly attached, for instance bonded, to it. The vibration generator 2 has a plate 3 which receives the sensor surface 1, whereby the frequencies and/or amplitudes produced by the vibration generator 2 are transmitted to the sensor surface 1. The vibration generator 2 is so constructed that its plate 3 can also carry out vertical movements.

The high-resolution input surface is approximately the size of one's hand. The resolution is approximately 200×200 or more sensor elements.

If a user touches the sensor surface 1 with his hand 4, then, by means of the capacitively operating sensor surface 1, it is determined at what point of the sensor surface 1 the contact with the hand 4 took place.

The capacitive sensor surface 1 is connected via an input/output unit 6 to a microcontroller 5 which evaluates the position signal from the sensor surface 1. For this purpose, the microcontroller 5 has a data memory 7 in which frequencies and/or amplitudes and changes in height are stored as a function of the coordinates of the sensor surface. This association of the frequencies and/or amplitudes and changes in height with the coordinate system corresponds to an actual operating function, which is visually displayed to the user as a menu on a display device 11. This menu is provided by an information system 10 of higher order which is also connected to the microcontroller 5.

The detected position is transmitted to the information system 10 by the microcontroller 5 for the control of a complex operating function.

The microcontroller 5 directs, coordinate-oriented in accordance with a virtual reference pattern of any desired shape which is placed over the surface 1, a vibration of the input surface, in which a frequency corresponding to the position of the user 4 on the sensor surface 1 is sent by the microcontroller 5 via a digital-to-analog converter 8 and an amplifier 9 to the vibration generator 2.

Figure 2:
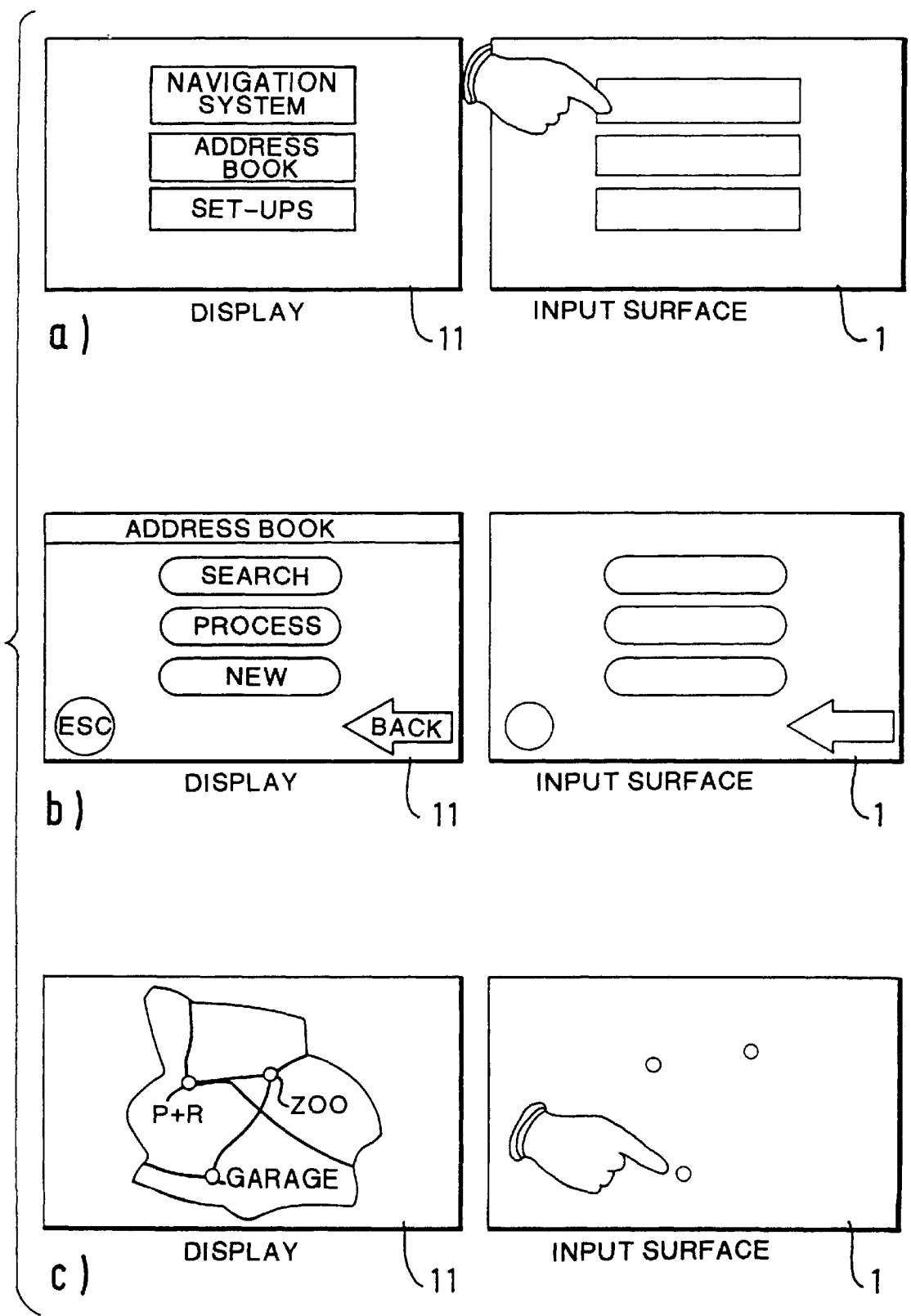
FIG. 2 shows different menu structures and their correspondingly produced virtual reference patterns for the production of a tactile "switch touch".

As shown in FIG. 2a, the input surface consists of for instance, three virtual switch surfaces which correspond to a displayed menu structure (navigation system, address book, set-ups). In the memory 7 of the microcontroller 5, these three switch surfaces are associated with different frequencies f1 to f3. If the user touches the parts of the input surface which correspond to the "navigation" function and are stored as first switch surface, then the entire input surface vibrates with the frequency f1. Similarly, the entire input surface vibrates with the frequencies f2 and f3 when the input surface is touched at the positions of the switch surfaces 2 (address book) and 3 (set-ups) respectively. Upon brushing over the input surface the user thus receives a tactile impression of three switches. It may again be pointed out that these three switch surfaces are not actually present on the input surface but the impression of their existence is merely produced by the movement of the input surface. In this way a blind operation of functions is optimally supported. The possibility of blind operation is a central requirement for the use of information systems in motor vehicles in order to keep the distraction by interaction with the information system as little as possible.

The decisive factor is that the entire input surface vibrates in each case with the frequency corresponding to the position of the user. The virtual reference pattern can be freely defined by software.

In order to produce an input command, a linear pressure sensor 13 is arranged on the side of the plate 3 of the vibration generator 2 facing away from the sensor surface 1 (FIG. 1). However, several pressure sensors may also be arranged below the sensor surface.

If the user decides in favor of menu surface 2 (address book), then he presses upon occurrence of the frequency f1 on the sensor surface 1 and the pressure sensor 13 transmits this information to the information system 10. Due to this input command, the information system changes the existing operating menu and displays a different picture on the display 11 (FIG. 2b). Furthermore, the information system 10 indicates to the microcontroller 5 that it should provide from its memory 7 the virtual reference pattern which corresponds to the new operating command.

While the input surface again vibrates upon the touching of the virtual switch surfaces—"search", "process", or "new"—with the frequency f1, f2 or f3, when the switch surface "escape" is touched the input surface is shifted in height in the direction towards the input member. Upon touching the switch surface with the function "back", the input surface is also displaced in height towards the input member, but at the same time it however also vibrates with a frequency f4.

In FIG. 2c, there is shown a city map with 3 indicated points, the input surface vibrating, when the position of the input member corresponds to one of the three points, with the first, second or third frequency, depending on the position.

By means of this simple software-control, it is possible to produce a simple input device which can be used, in particular, in motor vehicles.

We claim:

1. A method of producing tactile markings on an input surface, wherein information in the form of movements of the input surface is transmitted to an input member, comprising the steps of:

detecting the position of the input member on the input surface;

comparing the position which has thus been detected with a virtual coordinate-oriented reference pattern which associates specific movement with each position;

as a function of the position of the input member, moving the entire input surface with said movement in correspondence with the position; and wherein the entire input surface, in said movement step, is changeable in height depending on the position of the input member.

2. A method of producing tactile markings on an input surface, wherein information in the form of movements of the input surface is transmitted to an input member, comprising the steps of:

detecting the position of the input member on the input surface:

comparing the position which has thus been detected with a virtual coordinate-oriented reference pattern which associates specific movement with each position;

as a function of the position of the input member, moving the entire input surface with said movement in correspondence with the position; and further comprising a step of placing the entire input surface in vibration with a frequency and/or amplitude corresponding to the position of the input member.

3. A method according to claim 2, wherein, in said placing step, vibrations are produced in the input direction.

4. A method according to claim 3, wherein the vibrations are produced continuously.

5. A method according to claim 2, wherein, in said placing step, vibrations are produced in a pulsed manner.

6. A system for producing tactile markings on an input surface wherein information in the form of movements of the input surface is transmitted to an input member, the system comprising:

a position-detecting input surface and an evaluation unit connected to the input surface;

a position actuator for imparting movement to said input surface; and wherein the evaluation unit stores a virtual reference pattern and conducts signals to said position actuator, and said actuator carries out the movement corresponding to the position detected; and said actuator is operative to provide that a height of the whole input surface is variable in dependence on a position of the input member.

7. A system according to claim 6, wherein the position-indicating input surface detects the position of the input member by capacitive sensing.

8. A system according to claim 6, wherein the position-indicating input surface detects the position of the input member by acoustic sensing.

9. A system according to claim 6, wherein the position-indicating input surface detects the position of the input member by optional sensing.

10. A system according to claim 6, wherein the position-indicating input surface detects the position of the input member by pressure sensing.

11. A system according to claim 6, wherein the position-indicating input surface detects the position of the input member by ultrasonic sensing.

12. A system according to claim 6, wherein the input surface is flat.

13. A system according to claim 6, wherein the input surface is curved.

14. A system according to claim 6, wherein the position actuator is a vibration generator.

15. A system according to claim 6, further comprising at least one sensor provided on the position actuator for transmitting input information.

16. A system according to claim 15, wherein said sensor for transmitting input information is a pressure sensor.

17. A system according to claim 16, further comprising an information system, wherein said sensor for transmitting input information is connected with the information system.

18. A system for producing tactile markings on an input surface comprising:

a position-detecting input surface and an evaluation unit connected to the input surface;

a position actuator for imparting movement to said input surface;

wherein the evaluation unit stores a virtual reference pattern and conducts signals to said position actuator, and said actuator carries out the movement corresponding to the position detected, the system further comprising:

at least one sensor provided on the position actuator for transmitting input information;

an information system, wherein said sensor for transmitting input information is connected with the information system, and said sensor for transmitting input information is a pressure sensor; and the information system controls complex operating functions of the marking system; and said system is connected to the evaluation unit for adapting the virtual reference pattern to an actual operating function.

19. A system for producing tactile markings on an input surface comprising:

a position-detecting input surface and an evaluation unit connected to the input surface;

a position actuator for imparting movement to said input surface;

wherein the evaluation unit stores a virtual reference pattern and conducts signals to said position actuator, and said actuator carries out the movement corresponding to the position detected, the system further comprising:

at least one sensor provided on the position actuator for transmitting input information;

an information system, wherein said sensor for transmitting input information is connected with the information system, and said sensor for transmitting input information is a pressure sensor; and said system further comprises a visual device and a speech output unit; and wherein said information system is connected to the visual device for displaying an operating function of the marking system via the speech-output unit.

20. A system for producing tactile markings on an input surface comprising:

a position-detecting input surface and an evaluation unit connected to the input surface;

a position actuator for imparting movement to said input surface;

wherein the evaluation unit stores a virtual reference pattern and conducts signals to said position actuator, and said actuator carries out the movement corresponding to the position detected, the system further comprising:

at least one sensor provided on the position actuator for transmitting input information;

an information system, wherein said sensor for transmitting input information is connected with the information system, and said sensor for transmitting input information is a pressure sensor; and the information system has a speech output unit.

21. A system for producing tactile markings on an input surface wherein information in the form of movements of the input surface is transmitted to an input member, comprising:

a position-detecting input surface and an evaluation unit connected to the input surface;

a position actuator for imparting movement to said input surface; and wherein the evaluation unit stores a virtual reference pattern and conducts signals to said position actuator, and said actuator carries out the movement corresponding to the position detected; and said position actuator is operative to place the entire input surface in vibration with a frequency and/or amplitude corresponding to the position of the input member.

* * * * *